United States Patent
Salapura et al.

(10) Patent No.: US 6,904,040 B2
(45) Date of Patent: Jun. 7, 2005

(54) PACKET PREPROCESSING INTERFACE FOR MULTIPROCESSOR NETWORK HANDLER

(75) Inventors: Valentina Salapura, Yorktown, NY (US); Christos J. Georgiou, Scarsdale, NY (US)

(73) Assignee: International Business Machines Corporaiton, Armonk, NY (US)

( * ) Notice: Subject to any disclaimer, the term of this patent is extended or adjusted under 35 U.S.C. 154(b) by 799 days.

(21) Appl. No.: 09/682,689

(22) Filed: Oct. 5, 2001

(65) Prior Publication Data

US 2003/0067930 A1 Apr. 10, 2003

(51) Int. Cl.$^7$ .............................................. H04L 12/56
(52) U.S. Cl. .................. 370/395.32; 370/412; 709/250
(58) Field of Search ......................... 370/392, 395.32, 370/401, 412; 709/236, 238, 250

(56) References Cited

U.S. PATENT DOCUMENTS 5,938,736 A * 8/1999 Muller et al. ............... 709/243
6,449,251 B1 * 9/2002 Awadallah et al. ......... 370/229
6,625,654 B1 * 9/2003 Wolrich et al. ............. 709/230
6,631,422 B1 * 10/2003 Althaus et al. ............. 709/250

* cited by examiner

Primary Examiner—Man U. Phan
Assistant Examiner—Toan Nguyen
(74) Attorney, Agent, or Firm—Whitham, Curtis & Christofferson, P.C.; William D. Sabo

(57) ABSTRACT

A network handler uses a DMA device to assign packets to network processors in accordance with a mapping function which classifies packets based on its content, e.g., bits in one or more header fields. Preferably, the mapping function is implemented as a hash function, which uses a predetermined number of bits from packet as inputs. The result of this function specifies the processor to which the packet is assigned. To make implementation manageable in a high-traffic environment, each processor may be equipped with a queue, which holds pointer information. Such a pointer provides an indication of the area in memory where incoming packet resides. The network handler is particularly useful in a Fiber Channel environment, where the hash function may be implemented to assign all packets from the same sequence to the same processor, thereby resulting in improved processing efficiency.

17 Claims, 5 Drawing Sheets

PACKET PREPROCESSING INTERFACE FOR MULTIPROCESSOR NETWORK HANDLER

BACKGROUND OF THE INVENTION

1. Field of the Invention

This invention generally relates to network communication systems, and more particularly to a network protocol handler architecture for processing and routing packets in high-traffic network environments.

2. Description of the Related Art

Conventional network protocol handlers are equipped with hardware that determines the processing functions to be performed on incoming packets. In operation, when a packet arrives from the network the hardware attached to the input port communicates packet arrival information to a processor which then performs protocol and/or routing actions. The processed packet is then sent to an output port for delivery to its intended destination. If the protocol handler acts as a router, the destination of a packet is another node in the network, and if the protocol handler is used as a network adapter, the destination of the packet is a host processor.

The hardware discussed above typically uses a direct memory access (DMA) circuit that receives incoming packets from an input port, writes the packet to memory, and then informs the network processor that a packet has been received. In conventional interfaces of this type, the informing step is implemented by either the DMA circuit raising an interrupt to controller or via a polling scheme. In this polling scheme, the DMA circuit sets a status word that is repeatedly read by the processor until a packet has actually been received.

To handle load requirements, high-traffic network interfaces can use a plurality of processors and/or threads to perform protocol functions. In a multiprocessor and/or multi-threaded environment, a packet has to be assigned to one of the plurality of processors. This task is often accomplished by one of the processors using one of several conventional assignment methods, such as table lookup, round-robin, or first come-first serve. These conventional packet assignment methods suffer from one or more of the following disadvantages:

• High cost of determining handler processor/thread.

• Random distribution of packets to processors/threads, which can lead to significant lock contention and therefore performance degradation.

• Reordering of packets from a single sequence due to different processing latencies, which is the result of different load profiles of processors/threads.

• Inefficient exploitation of the system attributable to uneven distribution of work among processors/threads.

In view of the foregoing considerations, it is apparent that a need exists for a system and method of improving packet handling in network interface equipment, and more specifically one which assigns packets to one of the processors/threads more efficiently by using a mapping function which keeps packet sequences intact when processed.

BRIEF SUMMARY OF THE INVENTION

It is one object of the present invention to provide a method that supports multi-threading and/or multiprocessor computation for processing packets within a network handler more efficiently compared with conventional methods.

The disclosed method distributes packets to processors uniformly preferably by using a hash function.

Another object of the present invention is to provide a direct memory access (DMA) device that implements a dispatch mechanism which balances the incoming traffic among several threads or processors. By using such a dispatching mechanism, the assignment of packets to threads is decided in a way which improves overall performance and avoids extensive lock contention, which is especially beneficial in a high-traffic environment.

The foregoing and other objects of the invention are achieved by providing a network handler, which includes the following:

• A plurality of processors for packet processing.

• A port macro which understands a multi-threaded environment and performs load balancing among the processors/threads.

• A hash function to balance the assignment of jobs to multiple threads

• A DMA device to dispatch jobs to multiple threads.

The system of the present invention includes a network handler of this type for processing data using multiple processors and/or threads. In operation, data are received in a port macro, stored to a memory using a DMA device, and then assigned to one of the plurality of processors using a dispatch mechanism. The port macro may or may not implement network protocol preprocessing. In a preferred embodiment, the port macro has a FIFO buffer for buffering the received network data. In addition to transferring the received data from the in-bound FIFO to the memory, the DMA device assigns received packets to one of several threads for processing in accordance to a mapping function.

The mapping function for task assignment is preferably implemented as a hash function, which is based on information included in the packets such as one or more header fields or payload. The plurality of processors, or threads, in the proposed network handler exchange messages using queues, which hold pointer to a memory area where a packet is stored.

In a preferred embodiment, the protocol handler is implemented for Fibre Channel network architecture environment, and the mapping function uses several fields from the packet header for function arguments. In Fibre Channel, a single information unit is called a sequence and consists of one or more packets.

Using a hash function for workload assignment is beneficial for several reasons:

• Low cost of determining handler thread—implementation of a hash function is simple, and the result is calculated in a short time.

• All packets from the same sequence are assigned to the same thread for processing. This reduces the average amount of data which has to be obtained form the system memory per packet, as significant amount of data are already available in the thread. Thus, the number of load instructions is reduced, which reduces the traffic on the handler bus or switch. In addition, having several threads competing for the same data in the memory can lead to significant lock contention and therefore performance degradation.

• No reordering of packets in the same sequence—such as occurs in other task distribution methods like "round-robin" and "first come-first serve"—happens because all packets from a sequence are distributed to the same thread.

• Distribution of packets among threads is uniform on a sequence basis. Uniform distribution is a characteristic of hash function. This ensures efficient exploitation of the overall system.

These benefits are particularly important for customer premise equipment, where few sequences are typically active at the same time but with high bandwidth and low latency requirements (e.g., for networked storage traffic).

DETAILED DESCRIPTION OF THE INVENTION

Description of the Preferred Embodiments

The present invention is a system and method for improving the performance of a network handler by processing packets in parallel on multiple processors. To accomplish this objective, the present invention assigns the packets to processors within the network protocol handler in accordance with a mapping function. The mapping function assigns packets based on the contents of the packets, such as, for example, information in one or more header fields, or data from the payload. The invention is especially adept at routing packets that belong to the same sequence to the same processor, thus reducing bus traffic within the handler and lock contention, thereby increasing efficiency and throughput.

Figure 1:
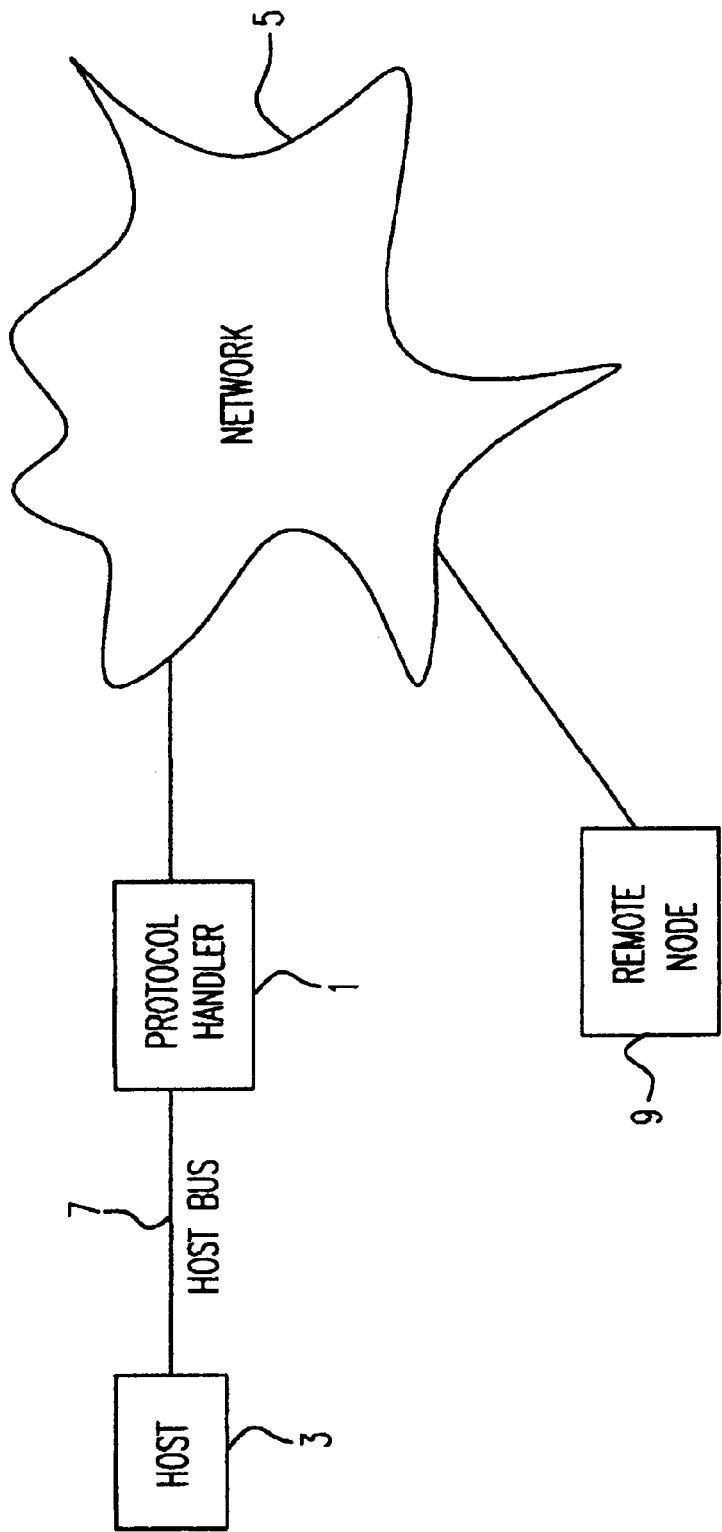
FIG. 1 is a diagram of a protocol handler in the network architecture.

Referring to FIG. 1, the position of a network handler in the overall network system is shown. The network handler 1 connects the host processor system 3 to the network 5. The network handler performs all tasks necessary for receiving and transmitting data to the network, thus reducing the processing load on the host processor.

In performing the transmitting function, the network handler 1 receives data to be sent to the network from the host 3 via the host bus 7, performs tasks specific for the network architecture such as connection establishment, data encapsulation and formatting, and transmits data to the network 5 for eventual receipt by a remote node 9. For receiving data from the network 5, the network handler receives and buffers the incoming packets, performs network architecture specific tasks, such as acknowledgment generation, data extraction, and sends data to the host processor 3 via the host bus 7.

Figure 2:
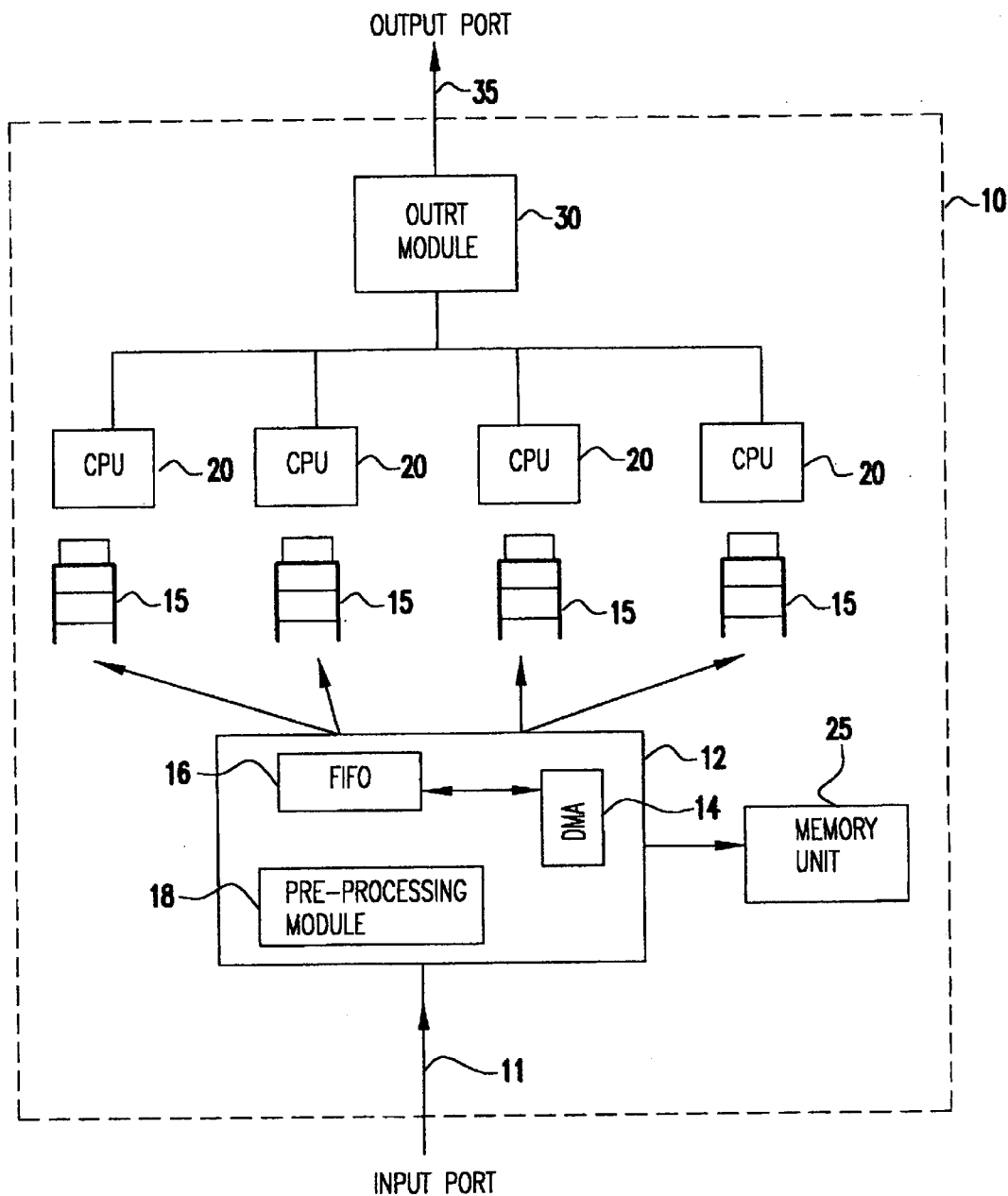
FIG. 2 is a diagram of a preferred embodiment of a network handler, which distributes incoming packets to one of the plurality of processors in an efficient manner in accordance with the present invention.

Referring to FIG. 2, a network handler 10 for routing packets in accordance with a preferred embodiment of the present invention includes an input port 11, an input port module 12, a plurality of work queues 15, a plurality of network processors 20, a memory unit 25, an output port module 30, and an output port 35. The input port is connected to network architecture of virtually any type, and the output port is connected to the host bus 7 shown in FIG. 1. The input port module 12 includes a DMA device 14, a FIFO (first-in, first-out) buffer 16, and may or may not include a network protocol preprocessing module 18.

Each processor 20 in the protocol handler has a corresponding work queue 15. In the preferred embodiment described in greater below, the queues store pointers which indicate locations of the packets stored in the memory unit 25. The work queues may be organized as ring buffers or FIFO buffers, and may be implemented as dedicated hardware, or logically mapped in the memory area. In the latter case, the memory assignment to the queues is done as a part of initialization and is not changed during the normal operation of the protocol handler.

The input port module 12 receives the packets through the input port 11 and stores them into the local FIFO buffer 16. The DMA controller 14 initiates and controls the transfer of the data from the FIFO buffer 16 to the memory unit 25. The port module 12 may or may not include logic 18 for a number of pre-processing steps prior to the packets being transferred to the memory unit 25, depending on the network protocol implemented. These pre-processing steps include CRC checking and generation, network protocol tasks on a link level, etc.

A mapping function determines the destination processor based on information in the packet, so the pointer is stored to the work queue of the selected processor. In the preferred embodiment, the mapping function is implemented as a hash function. This is accomplished by using several fields from the header of the packet or from its payload and applying several logical operations such as OR, AND, XOR, etc. The result of the operation selects one of the processors, and the pointer to the packet is stored to the work queue of that processor. Workload assignment using the hash function and storing pointers to a work queue of the selected processor can be easily added to the DMA controller.

In operation, when a processor is ready for processing a new packet, the processor reads the pointer from its associated work queue and starts performing protocol tasks. In a preferred embodiment implementing a Fibre Channel network architecture, these tasks include frame validation, managing network traffic at the sequence and exchange level, generating acknowledgment frames, reordering of frames—if required by the class of service—keeping track of end-to-end credit, etc. In other network architectures, required tasks executed by the processor can vary to accommodate network protocol specifics. If implementing conversion between two network protocols, such as, e.g., Fibre Channel and Infiniband network protocols, additional tasks—such as repacking of data and generation of the packet header—have to be implemented, to transfer the network traffic from one network to the another.

Once processed, the packets are transferred to the output port module 30, and then sent to the host via the host bus 7. In the preferred embodiment, the network handler is connected to a host processor, but the same method can be applied for implementing a router having a plurality of processors, as to anybody skilled in the art will be apparent.

Figure 3:
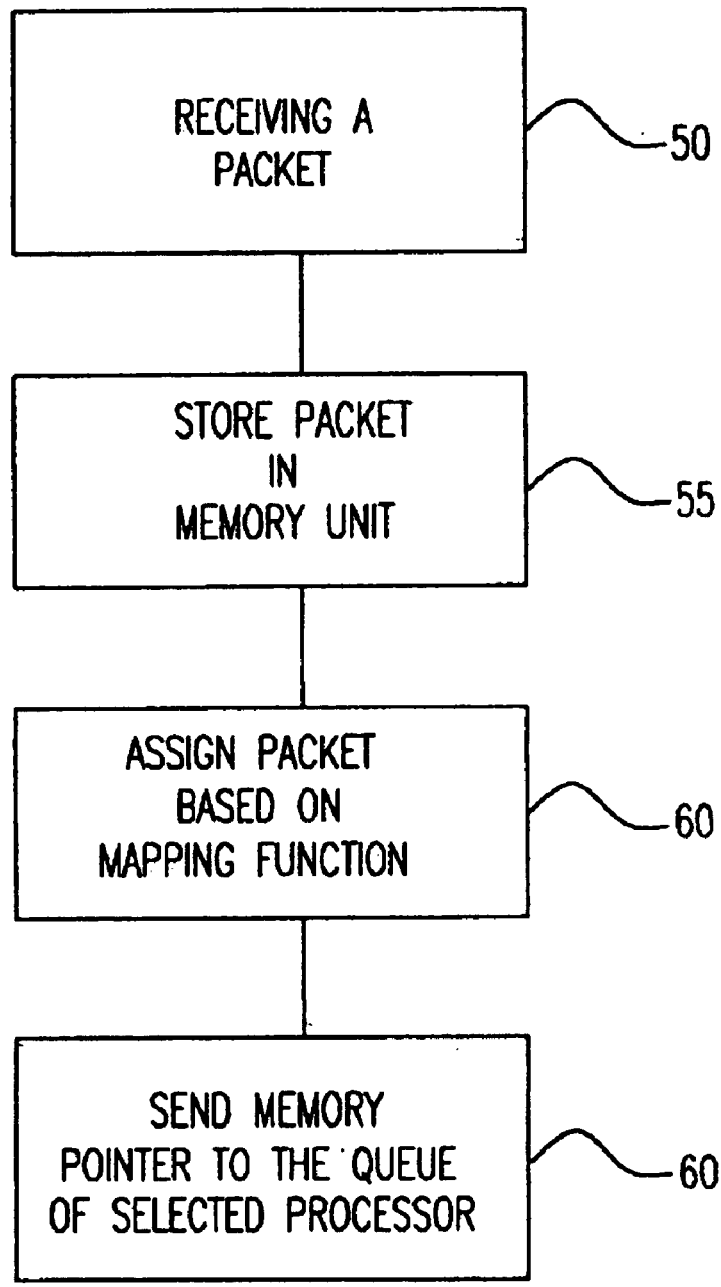
FIG. 3 is a flow diagram showing steps included in an embodiment of the method of the present invention for processing packets in the protocol handler.

Referring to FIG. 3, a preferred embodiment of the method of the present invention includes, as an initial step, receiving a packet, which includes header information through the input port (Block 50). Once received, the packet is stored in the memory unit (Block 55). The DMA controller 14 located in the port module 12 controls storing of the packet from the FIFO buffer 16 located in the input port module to the memory.

The packet is assigned to one of the processor using a hash function. (Block 60). The hash function is implemented in the DMA unit. To assign packet to one of the processors, the hash function is preferably based on information in one or more of the header fields of the packet, but in some other embodiment, payload data can be used for this purpose. The information extracted form the header for the hash function may be any number of bits in the header field, and by way of example these bits may correspond to source identification information, exchange originator identification, sequence identification, or any other filed, or subset of the filed form the header, or any combination thereof.

The packet assignment function performed by the DMA unit ensures that all packets from the same sequence are assigned to the same processor. To ensure this, the sequence identification field—using this entire field or only its pieces—is used as input to the hash function. As the host 3 can simultaneously exchange information with more than one remote node 9, packets originating from different nodes can have the same sequence identification. To overcome this ambiguity, the hash function can include a source identification field, or a part thereof, as an argument of the hash function.

Once the packet has been assigned to a processor, the DMA unit sends the pointer to the memory area where the packet is stored to the queue associated with the selected processor (Block 65). This pointer information is then read by the processor to access the packet from memory and processed. It is understood that the use of queues is an optional but preferable feature of the present invention.

The mapping function performed by the DMA unit of the present invention may be implemented as a hash function, which transforms keys that specify a set of items into table addresses. The set of items may correspond to received packets, the keys may correspond to one or more header fields of the packets, and the table addresses may correspond to the selection of one of the processors.

A hash function is preferable for purposes of implementing the mapping function of the invention because it combines any number of input bits to yield an output of fewer bits. In accordance with the invention, the input bits may be the header bits previously discussed, which may be quite significant in number (e.g., 192 bits). The output bits may correspond to encoded information which identifies a selected one of the processors for each packet under consideration. The DMA unit may compute the hash function using logical and arithmetic instructions, a hard-wired circuit, or a hash table look-up stored, for example, in the memory unit or a separate cache.

Hashing is performed strictly on an exact-match basis and assumes the number of processors that the system must handle at any one time is limited. When implemented, the hash function operates as a compression algorithm which condenses predetermined bits in the header field of a packet to a smaller-sized entry which maps to a unique location in the stored table.

Figure 4:
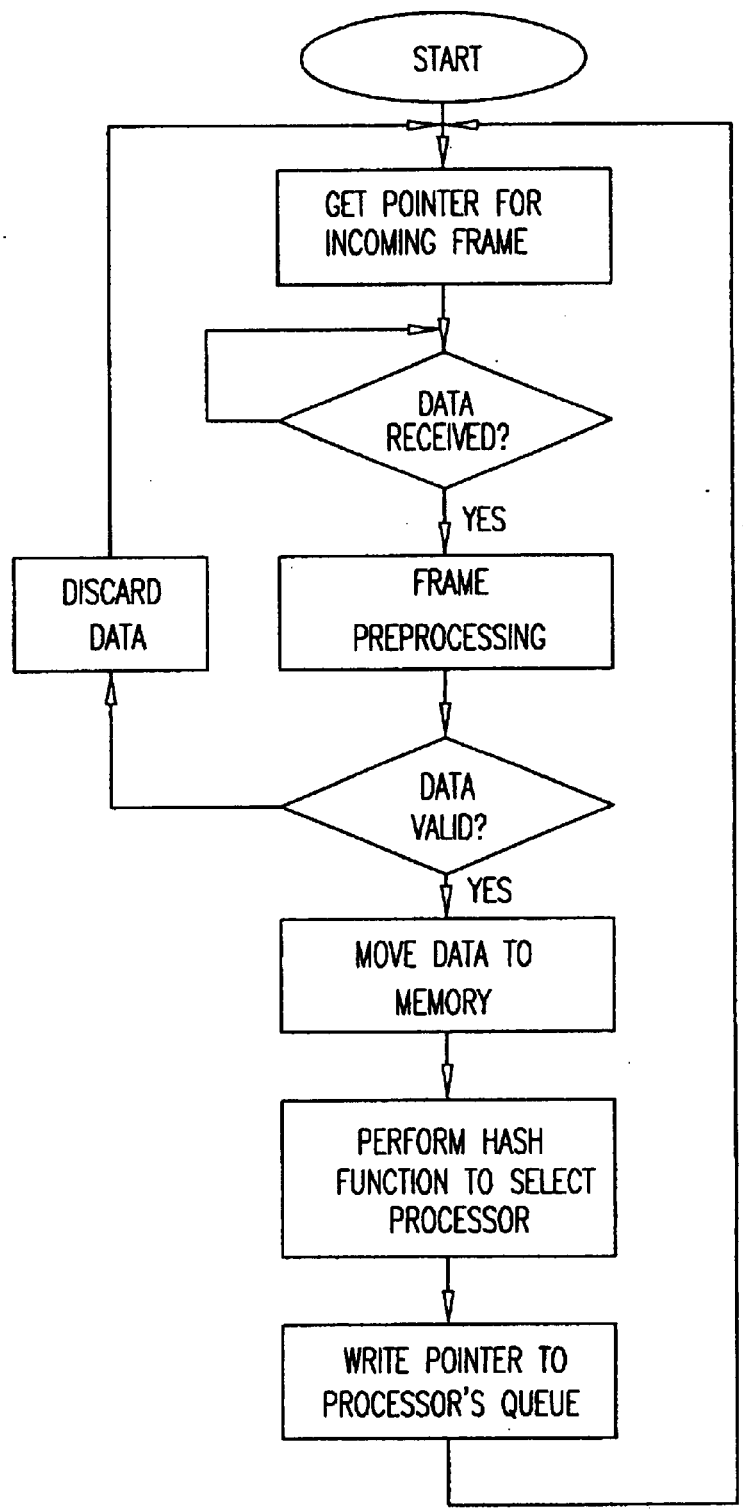
FIG. 4 is a flow diagram showing steps included in a preferred embodiment of the method of the present invention for assigning packets to threads for processing.

Referring to FIG. 4, an embodiment of the method of the present invention that performs processor selection using a hash function begins by obtaining pointer information corresponding to a memory area where an incoming packet is to be stored (Block 100). The DMA unit then performs a check to determine whether a packet has been received through the input port (Block 110). If no data packet has been received, the input port is checked until a packet is received.

When a packet is received, frame pre-processing is performed (Block 120). This frame pre-processing step can include but are not limited to CRC (cyclic redundancy check) checking, packet partitioning into header information and payload, etc.

In a next step, the correctness of the received packet is determined (Block 130). Here is checked the correctness of the packet on the single packet level, e.g., if the packet delimiters are correct and in a proper combination, etc. If the packet is detected to be invalid, the packet is discarded (Block 140).

In a next step, the DMA unit transfers the packet to the memory (Block 150). The packet is stored in the memory area that corresponds to the pointer information generated in the first step.

In a next step, the packet is assigned to one of the processors in accordance to the hash mapping function discussed below. Specifically, the DMA unit inputs a predetermined number of bits from one or more header fields of the packet into the hash function. The result "r" of the hash function is a number in the range (0 to n−1), where "n" is the number of the processors. The result selects one of the processors (Block 160).

In a next step, the pointer information generated in the initial step is written into the work queue, which corresponds to the processor identified by the output of the hash function (Block 170). The processor reads pointers from its respective queues, and then accesses the packets from the memory areas corresponding to those pointers. The packets are then processed and then sent through the output port to the output port module.

Figure 5:
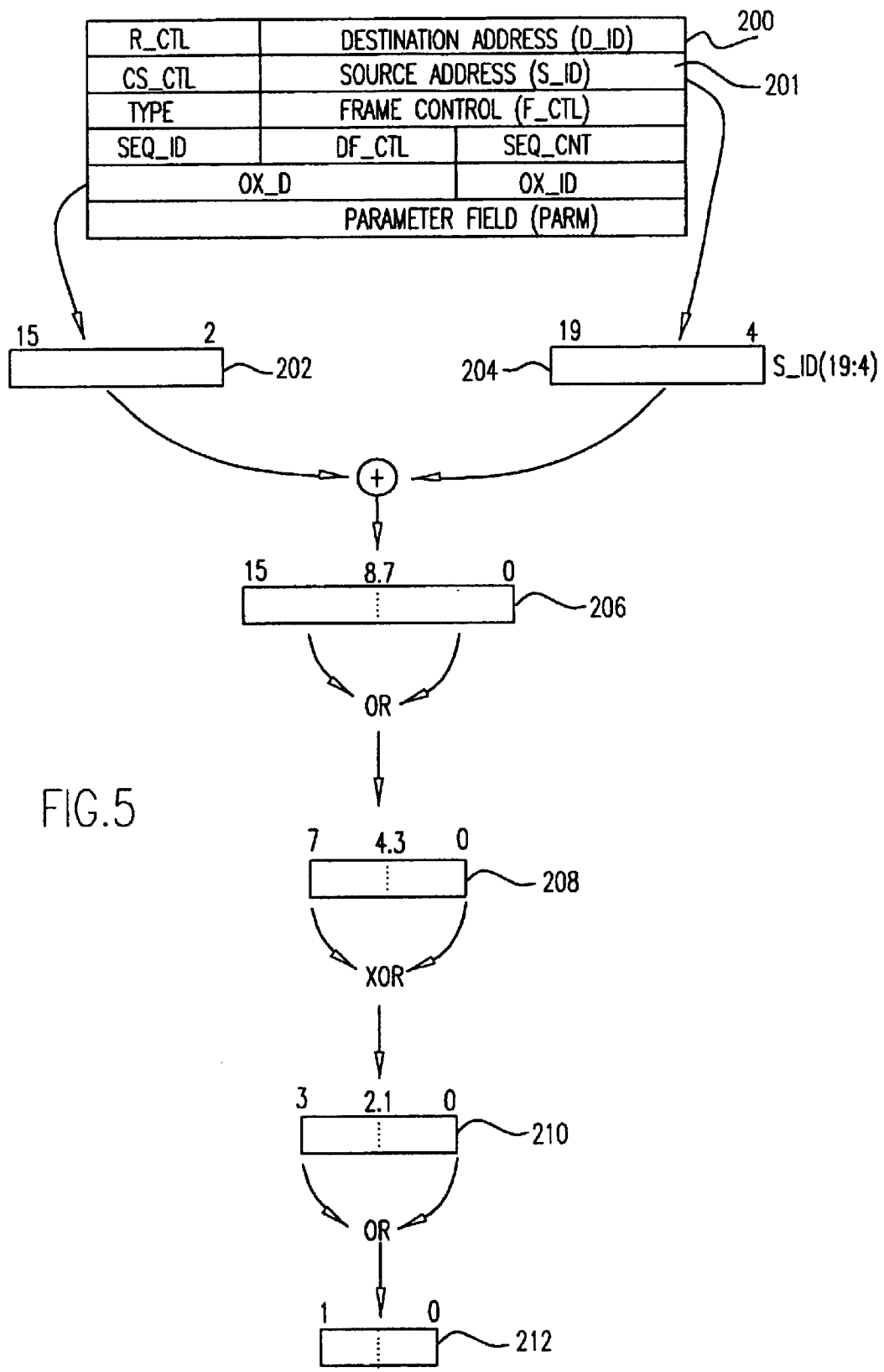
FIG. 5 is an example of implementation of a hash function for workload assignment between four processors based on the contents of the packet header.

Referring to FIG. 5, an example is given of the implementation of a hash function for workload assignment. In the case of a Fibre Channel protocol, the hash function performed by the DMA unit of the present invention may operate on the source identification (S_ID) field 201 and exchange originator identification (OX_ID) field 202 in the frame header of a received packet 200. The width of this information is 24 bits for the S_ID field and 16 bits for the OX_ID field. Under these conditions, a hash function (H) for selecting one of four processors may be specified in accordance with equations below:

$$Tmp(15:0)=S\_ID(19:4)\, xor\, OX\_ID (206)$$

$$Tmp(7:0)=Tmp(15:8)\, or\, Tmp(7:0) (208)$$

$$Tmp(3:0)=Tmp(7:4)\, xor\, Tmp(3:0) (210)$$

$$Tmp(1:0)=Tmp(3:2)\, or\, Tmp(1:0) (212)$$

$$H=Tmp(1:0) \qquad [t1]$$

Here notation "S_ID(19:4)" means bits 19 to 4 from the S_ID field (204), "Tmp" is a temporary variable, "xor" stands for XOR logical operation and "or" stands for an OR logical operation. The result "H" is an integer in the range 0 to 3, and determines one of the four processors.

As an example, for the S_ID field having value 0x011000 in the hexadecimal notation, and the OX_ID field being 0xAB88, the calculation will proceed as follows:

$$S\_ID(19:4)=0x1100$$

$$OX\_ID=0xAB88$$

$$Tmp(15:0)=S\_ID(19:4)\, xor\, OX\_ID=0xBA88$$

$$Tmp(7:0)=Tmp(15:8)\, or\, Tmp(7:0)=0xBA$$

$$Tmp(3:0)=Tmp(7:4)\, xor\, Tmp(3:0)=0x1$$

$$Tmp(1:0)=Tmp(3:2)\, or\, Tmp(1:0)=0x1$$

$$H=0x1 \qquad [t2]$$

So, the selected processor is the processor #1.

The output bits of the hash function identify one of the processors for each packet received. The DMA unit may compute the hash function as a hard-wired circuit for the logical and arithmetic operation.

By using a hash function for workload assignment, the present invention is able to outperform conventional network handlers in terms of cost and processing efficiency. More particularly, the invention provides a low cost way of determining handler thread because implementation of a hash function is simple and the result is calculated in a relatively short period of time compared with conventional handlers. Also, all packets from the same sequence are assigned to the same thread for processing. This reduces the average amount of data which has to be obtained from the system memory per packet, as significant amounts of data may already be available in the thread. As a result, the number of load instructions is significantly reduced, which in turn reduces the traffic on the handler bus or switch. Further, the invention avoids the conventional drawback of having several threads competing for the same data in the memory, as this can lead to significant lock contention and therefore performance degradation.

The invention also eliminates the necessity of having to re-ordering packets in the same sequence, such as occurs in conventional task distribution methods like "round-robin" and "first come-first serve." The invention accomplishes this objective by distributing all packets from a sequence to the same thread. This results in faster throughput and processing performance.

Further, one characteristic of a hash function is that it produces a uniform distribution. Thus, by using a hash function the invention is able to advantageously distribute packets among the threads uniformly on a sequence basis. This ensures efficient exploitation of the overall system.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. A method for processing packets in a network, said network including a direct memory access (DMA) device including an input port, a memory unit, a plurality of processors, and an output port, said method comprising:

receiving a packet through the input port;

performing a mapping function which includes assigning said packet based on information contained in said packet; and sending said packet to one of said plurality of processors based on the assignment performed by said mapping function.

2. The method of claim 1, wherein said mapping function assigns a plurality of packets in a manner which causes said processors to process a substantially equal number of packets.

3. The method of claim 1, wherein said information includes a predetermined number of bits in at least one header field of said packet.

4. The method of claim 3, wherein said header field contains at least one of source identification information and exchange originator identification information for said packet.

5. The method of claim 1, wherein said mapping function assigns packets from a same sequence to a same one of said plurality of processors.

6. The method of claim 1, wherein said mapping function is a hash function.

7. The method of claim 6, further comprising:

storing said packet in the memory unit, wherein said hash function transforms a key that specifies a set of items into a table address, said key corresponding to at least one header field of said packet, said set of items including a plurality of received packets, and said table address corresponding to a selection of said one of said plurality of processors.

8. The method of claim 7, further comprising:

sending pointer information to said one of said plurality of processors, said pointer information indicating a location of said packet stored in said memory unit.

9. The method of claim 6, wherein said hash function is implemented by one of logical and arithmetic instructions, a hardwired circuit, and a table lookup.

10. The method of claim 6, wherein said packet is transmitted using a fibre channel protocol, and wherein said header information includes source identification information and exchange originator identification data.

11. A device for routing packets in a network, comprising:

an input port for receiving a packet that includes header information;

a plurality of processors;

a memory unit; and a direct memory access (DMA) device which performs a mapping function that includes assigning said packet based on said header information, and which routes said packet to one of said plurality of processors based on the assignment performed by said mapping function.

12. The device of claim 11, wherein said mapping function assigns a plurality of packets in a manner which causes said processors to process a substantially equal number of packets.

13. The device of claim 11, wherein said direct memory access device stores said packet in the memory unit.

14. The device of claim 11, wherein said direct memory access device sends pointer information to said one of said plurality of processors, said pointer information indicating a location of said packet stored in said memory unit.

15. The device of claim 11, further comprising:

at least one queue, wherein said direct memory access device stores pointer information in said queue, said pointer information indicating a location where said packet is stored in the memory unit, and wherein said one of said plurality of processors reads said pointer information from said queue to access the packet stored in the memory unit.

16. The device of claim 15, wherein said queue is a FIFO buffer.

17. The device of claim 15, wherein said queue is a ring buffer.

* * * * *